United States Patent

[11] 3,559,682

| | | |
|---|---|---|
| [72] | Inventor | George Sherman Morley<br>Goderich, Ontario, Canada |
| [21] | Appl. No. | 770,610 |
| [22] | Filed | Oct. 25, 1968 |
| [45] | Patented | Feb. 2, 1971 |
| [73] | Assignee | The Dominion Road Machinery Co.,<br>Limited<br>Goderich, Ontario, Canada |

[54] POWER CLUTCH-OPERATED RATIO-CHANGING MECHANISM FOR HYDRO-MECHANICAL TRANSMISSION SYSTEM
4 Claims, 6 Drawing Figs.

[52] U.S. Cl. ................................................. 137/596.15,
137/625.24, 91/446, 91/448
[51] Int. Cl. ............................................... F16k 11/10,
F15b 11/08
[50] Field of Search ........................................ 91/446,
448; 137/596.15, 625.22, 625.24, 625.63

[56] References Cited
UNITED STATES PATENTS

| 2,324,576 | 7/1943 | Gurries | 137/625.22 |
| 3,010,479 | 11/1961 | Foley | 137/596.15 |
| 3,370,513 | 2/1968 | Shore | 137/625.63X |
| 3,443,593 | 5/1969 | Colombo | 137/625.64 |

*Primary Examiner*—Henry T. Klinksiek
*Attorney*—Douglas S. Johnson

ABSTRACT: A hydraulic switching mechanism is formed of two cooperating valves, the first being a rotary type which directs fluid under pressure to a second valve of the sliding spool type which has springs at both ends to hold the spool in the neutral position. The rotary-type is formed of a body having a pair of diverging passages connecting through a chamber with an inlet port; a rotary valve member, having a passage therethrough connecting with the inlet port, is located in the chamber and is actuated by a reversible shaft to select the movement of fluid through the valve member into one or other of the diverging passages, these in turn being connected to a respective end of the spool valve thereby moving the spool out of neutral against a respective spring. The spool has a pair of ports which are connected to individual clutches, the actuation of which depends on the selected direction of flow in the switching mechanism.

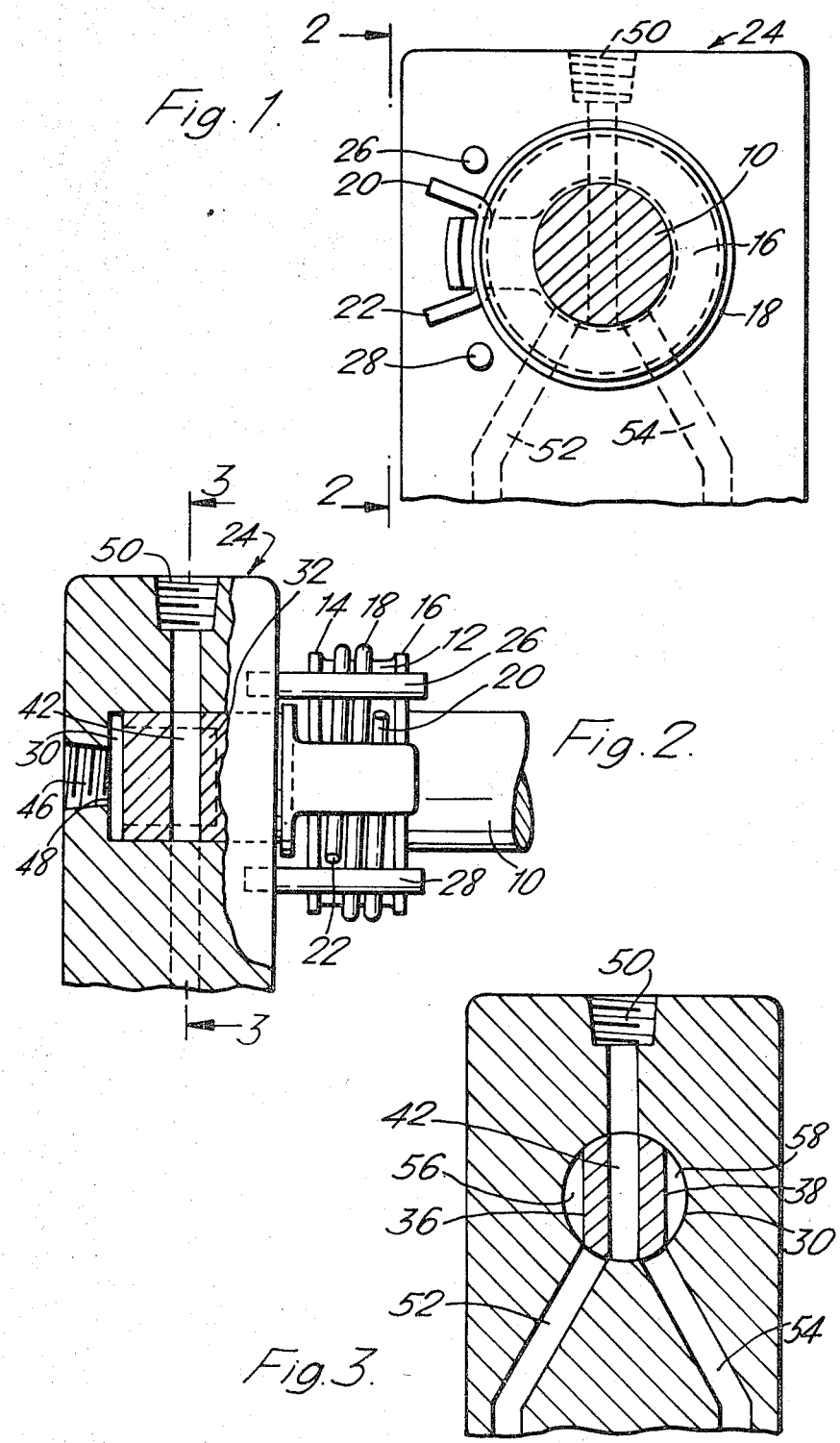

POWER CLUTCH-OPERATED RATIO-CHANGING MECHANISM FOR HYDRO-MECHANICAL TRANSMISSION SYSTEM

FIELD OF THE INVENTION

This invention relates to a hydraulic switching mechanism for directing fluid under pressure through individual passages, the flow of fluid through a selected passage being determined by the hydraulic switching mechanism in response to the direction of rotation of a reversibly rotatable shaft.

DESCRIPTION OF PRIOR ART

In U.S. Pat. No. 3,293,943 "Hydrostatic Transmission and Control Means Therefore" to J. G. MacDonald, Dec. 27, 1966 there is shown a spring loaded friction clutch which is mounted on the shaft of a reversible fluid motor; the friction clutch is connected by a link to a spool valve and when the shaft of the fluid motor reverses direction the friction clutch causes the spool valve to move through neutral from a high ratio to a low ratio or vice versa. A pair of high-pressure fluid lines lead from the spool valve to individual power clutches and depending upon the direction of rotation of the shaft one or other of the power clutches is thereby locked due to flow of oil through the individual pressure line.

While the above spring loaded friction clutch has proved a practical means of operating the spool valve a tendency has been noted for the friction-type clutch to heat under continuous operation. Furthermore, the use of a link to move the selector valve spool results in an undesirable time delay in filling one of the power clutches when the other is being emptied; this may cause erratic motion at the transmission output as the clutches change the ratio of the drive when the fluid motor reverses.

It is an object of the invention to provide a fluid operated mechanism which responds to the reverse rotation of a shaft member to selectively lock one or other of a pair of power clutches which mechanism is free from the problem occasioned by overheating and also ensures that the fluid fills one of the clutches before the other clutch is unlocked

BRIEF DESCRIPTION OF THE DRAWINGS

The invention will now be described in relation to the accompanying drawings, in which:

FIG. 1 is an end view of the hydraulic switching mechanism;

FIG. 2 is a partially sectioned view of the side of the hydraulic switching mechanism on the lines 2—2 of FIG. 1;

FIG. 3 is a cross-sectional view taken on the lines 3—3 of FIG. 2.

DESCRIPTION OF THE PREFERRED EMBODIMENTS

Figure 4:
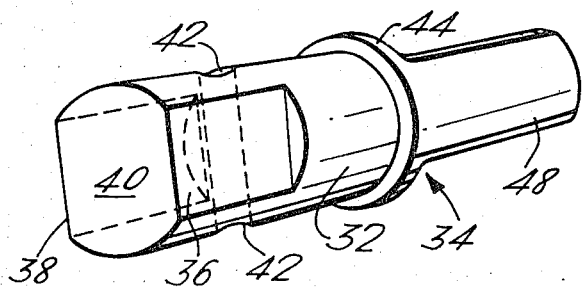
FIG. 4 is a perspective view of the rotary valve shown in FIGS. 2 and 3.
Figure 5:
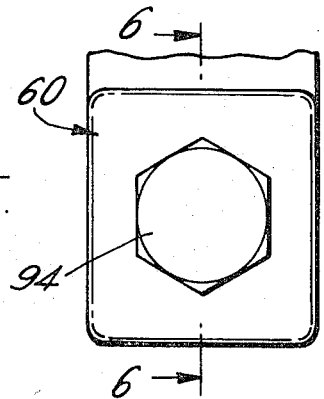
FIG. 5 is an end view of the sliding spool type spring centered valve which directs oil under pressure to one or other of the pair of power clutches.

With reference to the drawings and more particularly FIGS. 1 and 2 a reversibly rotatable shaft member 10 is shown which is geared or otherwise coupled to an actuating means not shown, such as a fluid motor. Shaft 10 has a collar 12 bounded by rims 14 and 16 to contain a coiled spring 18 which is in contact with the collar portion 12 of the shaft 10. The free ends 20 and 22 of the spring 18 overlap and are then bent outwards in spaced relation as shown more particularly in FIG. 1.

Adjacent the rim 14 of the collar 12 of the shaft 10 is a valve housing generally denoted by the numeral 24. A pair of stop pins 26 and 28 are secured in the valve housing 24 and pins 26 and 28 extending outwards in parallel relationship over the collar 12 and the spring 18 supported thereon. It will be observed from FIG. 1 that the stop pins 26 and 28 are so positioned to enclose the outwardly bent ends 20 and 22 of the spring 18 and to lie in the plane of circular movement of spring 18 on rotation of shaft 10.

The valve housing 24 has a cylindrical cavity 30 the main axis of which is parallel to the plane in which the pins stop 26 and 28 are located. The circular portion 32 of a valve member generally denoted by the numeral 34 is journaled in the cavity 30. The construction of the valve member 34 is more particularly shown in FIG. 4 where it will be observed that the circular portion 32 is provided with a pair of opposed flats 36 and 38 which extend to the end 40 of the valve member 34. The circular portion 32 has an open ended passageway 42 positioned between the flats 36 and 38.

The other end of the circular portion 32 removed from the end 40 of the valve member 34 is enlarged form a flange 44 which merges into a terminating plate portion 48.

When the circular portion 32 of the valve member 34 is located in the cavity 30 of the valve housing 24 the plate portion 48 extends outwards between the ends 20 and 22 of the spring 18 this being shown more particularly in FIG. 1.

The valve housing 24 has an oil return port 46 which communicates with the cylindrical cavity 30 through its base 48. The valve housing 24 has an inlet port 50 which enters the cavity 30 through its cylindrical wall. Opposed to the inlet port 50 are a pair of diverging passageways 52 and 54 the disposition of which, is shown more particularly in FIG. 3. The position of the flange 44 on the valve member 34 is such that when the flange 44 bears against the outer surface of the valve housing 24, the end 40 of the valve member 34 is spaced from the base 48 of the cavity 30. It will be apparent that the gaps 56 and 58 formed between the flats 36 and 38 and the cylindrical wall of the cavity 30 are in communication with the port 46.

The disposition of the passageway 42 with respect to the passageways 52 and 54 and the inlet port 50 with resulting flow of oil through the valve housing 24 is determined by the position of the valve member 34. Referring more particularly to FIG. 3 it will be observed that oil entering the inlet port 50 when the valve member 34 is in the position shown would flow into the open ended passageway 42 but could not exit therefrom. However, if the valve member 34 is rotated to the right in FIG. 1, oil would be directed into the passageway 52 in the valve housing 24 and oil could leave the passageway 54 through the gap 58. Likewise if the valve member 34 is rotated to the left, oil would enter the passageway 54 and return oil could leave passageway 52 through the gap 56.

Figure 6:
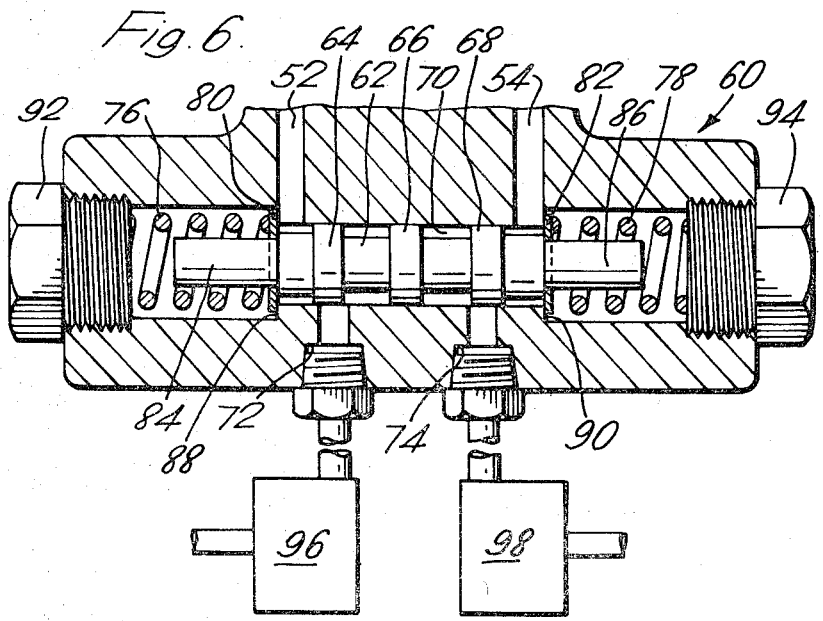
FIG. 6 is a cross-sectional view taken on the lines 6—6 of FIG. 5.

The valve housing 24 also contains a spool type valve, generally denoted by the numeral 60 and shown more particularly in FIG. 6. The valve 60 has a spool 62 having spaced apart lands 64, 66 and 68 which slidably bear against the cylindrical wall of a cavity 70, the opposed ends of which communicate with the passageways 52 and 54. The cavity 70 also has a pair of ports 72 and 74 positioned a smaller distance apart than passageways 52 and 54. The spool 62 is held in a position of equilibrium by springs 76 and 78 which bear against respective washers 80 and 82 loosely positioned on the reduced opposed ends 84 and 86 of the spool 62, the washers 80 and 82 bearing against abutments 88 and 90. The springs 76 and 78 are respectively compressed by threaded bolts 92 and 94.

The ports 70 and 72 are connected to individual power clutches designated by the numerals 96 and 98.

In the equilibrium position the outer lands 64 and 68 are between the passageways 52 and 54, but they seal off the ports 72 and 74 respectively. However, if oil enters the spool valve 60 through the passageway 52, the pressure of the oil bears against the land 64 on the spool 62 and eventually exerts sufficient compression on the spring 78 to move the spool 62 in that direction. As a result, compressed oil leaves the valve 60 through the port 72 to lock up the clutch 96; however, the movement of oil to unlock the clutch 98 will not take place until the clutch 96 has been locked and the spool 62 has been forced in the direction of the spring 78 to the degree where passageway 54 communicates with port 74. A similar but opposite action occurs when the oil enters passageway 54 to leave port 74 to lock up the clutch 98, in which case the valve spool 62 shifts to the left on compression of the spring 76.

The action of the hydraulic switching mechanism is initiated by rotation of the shaft 10. If the latter is rotated in a clockwise direction, with reference to FIG. 1, the coil spring 18 on the collar portion 12 rotates with the shaft 10 with the result that the end 22 of the coil spring 18 bears against the plate 48 of the valve member 34 thus causing the latter to turn in the same direction as the shaft 10. The other end 20 of the coil spring 18 contacts the stop pin 26 which is anchored in the valve housing 24; this in turn stops coil spring 18 from rotating on the collar 12 and tends to unwind or loosen the coil spring 18 from binding on the collar 12 thus reducing the friction after the valve member 34 has been turned to determine the flow of oil through the spool valve 60 in the manner previously described. A similar but opposite action occurs if the rotation of the shaft 10 is reversed. It will be appreciated that the stop pins 26 and 28 perform in a sense the dual function of eliminating both the movement of the coil spring 18 within a defined degree of travel and also reduce the binding friction of the coil spring 18 on the collar 12 once the valve member 34 has been turned. This method of operating ensures that once the spool valve 62 is operating with respect to the respective power clutches, either 96 or 98, friction between the coil spring 18 and the collar 12 is automatically reduced to prevent heating due to any excessive friction when the shaft 10 is turning at high speed.

As described above, the movement of the valve spool 62 is determined by pressure on the springs 76 and 78 which act to hold the spool 62 in the center position. The springs 76 and 78 thus prevent one clutch 96 from emptying and unlocking until the other clutch 98 is filled with oil and vice versa. This eliminates any undesirable lag occuring when the power clutches 96 and 98 change the ratio of the drive as fully described in U.S. Pat. 3,293,943.

I claim:

1. A hydraulic switching mechanism including a housing having a first cavity, a pressure inlet in said housing communicating with said first cavity, a pair of passageways communicating with said first cavity, a valve member journaled in said first cavity, means for reversibly rotating said valve member, said member sealing off said inlet from said passageways, an open ended channel in said valve member, a second cavity in said housing said pair of passageways communicating with said second cavity, a pair of ports in said second cavity, a spool having three spaced apart lands slidable on the wall of said second cavity, spring means maintaining said pair of lands between said passageways and sealing off said pair of ports, the arrangement being such that when said valve member is rotated in said first cavity said open ended channel communicates between said inlet and one of said passageways to transfer fluid into said second cavity to bear against the land adjacent said one passageway to move said spool against said spring means thereby permitting said fluid to flow through said spool valve into the port nearer said one passageway.

2. A switching mechanism according to claim 1 wherein said means for rotating said valve member is a reversibly rotatable shaft, means connecting said shaft and said valve member, said connecting means limiting the movement of said open ended channel in said valve member between said passageways.

3. A switching mechanism according to claim 2 wherein said connecting means comprise a coil spring mounted on said rotatable shaft, the opposed ends of said spring projecting from said shaft in spaced relationship, a pair of spaced apart stop means secured to said housing and projecting into the arcuate plane of rotation of said spring ends responsive to rotation of said shaft, said valve member extending outwards between said spring ends.

4. A switching mechanism according to claim 1 wherein said member has a pair of opposed flats with said open ended channel disposed between said flats and said housing has an oil return port communicating with the cavities formed between said flats and said first cavity.